A. A. GWALTNEY.
DEVICE FOR CLEANING COTTON.
APPLICATION FILED DEC. 29, 1914.

1,257,851.

Patented Feb. 26, 1918.
2 SHEETS—SHEET 1.

Inventor,
A. A. Gwaltney.

Witnesses.

By Victor J. Evans,
Attorney.

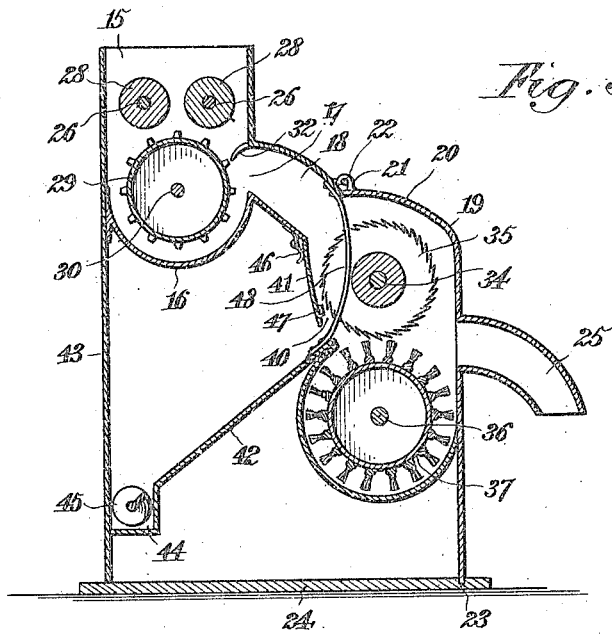

UNITED STATES PATENT OFFICE.

ABNER A. GWALTNEY, OF NODENA, ARKANSAS.

DEVICE FOR CLEANING COTTON.

1,257,851. Specification of Letters Patent. Patented Feb. 26, 1918.

Application filed December 29, 1914. Serial No. 879,533.

*To all whom it may concern:*

Be it known that I, ABNER A. GWALTNEY, a citizen of the United States, residing at Nodena, in the county of Mississippi and State of Arkansas, have invented new and useful Improvements in Devices for Cleaning Cotton, of which the following is a specification.

This invention relates to devices for cleaning cotton and particularly for separating the cotton and seeds from hulls, twigs and impurities of various kinds preparatory to the regular ginning operation.

The invention has for its object to produce a device of simple and inexpensive construction whereby cotton containing impurities, as above referred to, may be quickly and effectively separated therefrom without injury to the quality of the cotton and without loss of the seeds.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention, it being, however, understood that no limitation is necessarily made to the precise structural details therein exhibited, but that changes, alterations and modifications within the scope of the claim may be resorted to when desired.

In the drawings,—

Fig. 3 is a vertical sectional view taken on the line 3—3 in Fig. 2.

Fig. 4 is a side view of the machine opposite to that seen in Fig. 1.

Corresponding parts in the several figures are denoted by like characters of reference.

Figure 1:
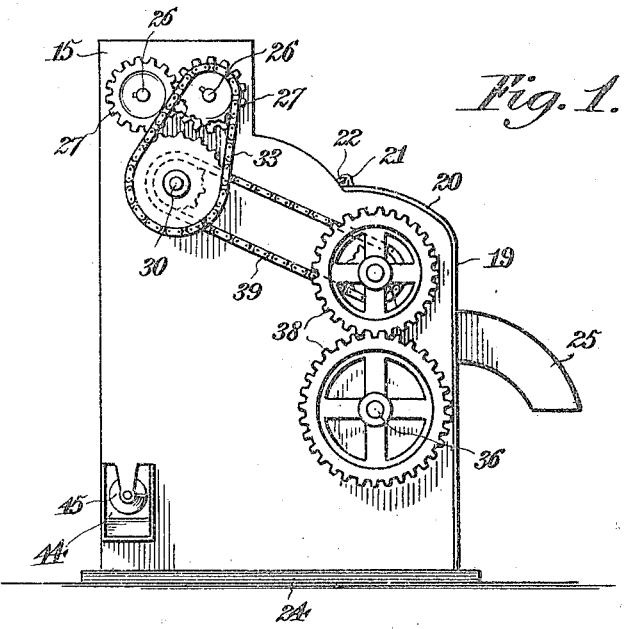
Figure 1 is a view in side elevation of a machine constructed in accordance with the invention.
Figure 2:
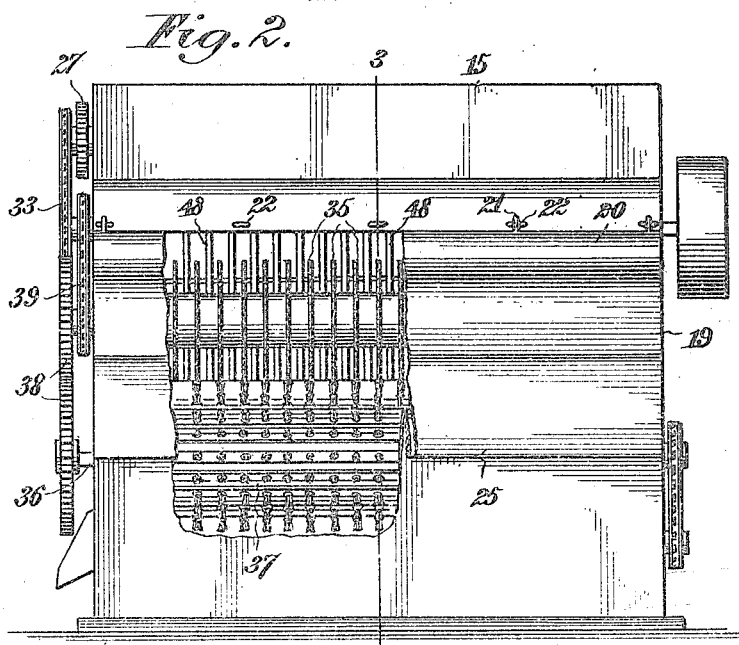
Fig. 2 is a front view of the same with parts of the casing broken away.

The frame or casing of the improved machine is constructed with a hopper 15 in the upper portion thereof, and said hopper which extends the entire width of the casing is provided with a semi-cylindrical bottom 16. The front wall of the hopper has a discharge opening 17 which is connected by a downwardly and forwardly extending wall forming a duct 18 with the upper portion of a housing 19, the front wall of which is formed by a shield 20 which is detachably connected, as by means of hooks 21 and 22, with the wall of the duct 18 along the upper edge of said shield, the lower portion of said shield being stepped in a groove 23 formed in the base 24. The shield 20 is provided with an outlet duct 25 communicating with the housing 19.

Supported for rotation in the end walls of the hopper 15 which also form the side walls of the casing are shafts 26 having intermeshing gears 27 and equipped with coacting feed rollers 28, whereby material supplied to the hopper will be fed downwardly to a toothed cylinder or beater 29 mounted on a shaft 30 which is equipped with a band wheel 31 which may receive motion by a belt or band from a suitable source of power, whereby the forward portion of the cylindrical beater will be driven upwardly with respect to the opening 17 communicating with the duct 18. Arranged adjacent to the upper edge of said opening 17 is a comb 32 which is curved rearwardly and downwardly in the direction of the cylinder 29, said comb terminating a material distance above the axis of the shaft carrying the said cylinder. The shaft 30 is connected by a belt or chain 33 with one of the shafts 26 to which motion in the proper direction will thus be imparted.

The housing 19 is appropriately constructed to contain a shaft 34 carrying saws 35 and also a shaft 36 carrying a brush cylinder 37, the latter being arranged beneath the saw carrying shaft. Ribs 48 suitably connected at their upper and lower ends with parts of the casing are positioned intermediate the saws 35 for the purpose of obstructing the passage of hulls, twigs and other impurities which it is desired to separate from the cotton, said ribs being, however, spaced sufficiently from the saws to offer no resistance to the passage of cotton and seeds. The shafts 34, 36 may be connected together by intermeshing gears 38 which are to be suitably proportioned to secure the desired relative speed. Motion in the proper direction may be transmitted from the shaft 30 to the saw carrying shaft 34 by a chain 39.

The rear wall of the housing 19 has an opening 40 which may be partly obstructed by a hingedly supported vibratory shield 41. The shield 41 does not entirely obstruct the opening 40, but a slight aperture is left between the lower edge of the shield and the upper edge portion of an inclined plate 42 which is connected with the wall of the housing and which extends downwardly in the direction of the rear wall 43 of the casing adjacent to which is arranged a shoe or trough 44 containing a spiral conveyer 45 which may be belted to the brush carrying shaft, as shown, or which may be driven in any convenient and appropriate manner. The inclined plate 42, together with the rear wall 43, the bottom 16 of the hopper 15 and the bottom wall of the duct 18 constitutes a chamber or compartment in which the impurities separated from the cotton will be received, the same gravitating to the trough 44 from which they are discharged by the spiral conveyer 45.

The vibratory shield 41 may be forced in the direction of the saw carrying shaft by the action of a spring 46, but stop members, as shown at 47, should be provided to prevent it from contacting with the saws. The spring 46 should be sufficiently light so that it will present no serious obstruction to the swinging movement of the shield.

In the operation of this device, the material when placed in the hopper 15 is fed between the rollers 28 to the cylindrical beater 29, whereby it is conveyed in the direction of the comb or deflector 32 where it is intercepted and discharged through the opening 17 and duct 18 to the housing 19. The cotton and seeds will be carried by the saws 35 between the ribs 38, said cotton and seeds being detached from the saws by the brush cylinder 37, by the action of which it is discharged through the spout 25. The hulls, twigs and impurities will pass beneath the vibratory shield 41 and will slide over the inclined floor or plate 42 into the trough 44 from which it is discharged by the spiral conveyer 45.

As will be seen from the foregoing description, the improved cleaner and separator is of very simple construction, and it has been efficiently employed for the purpose of separating hulls, twigs and other impurities from cotton before ginning. Access to the housing containing the saw carrying shaft and the brush cylinder may be conveniently had by removing the member 20 which constitutes the front wall of said housing and which may be readily lifted from its normal position. It is obvious that any well known means, other than those herein described, may be utilized for transmitting motion between the various moving parts of the device, and it is, furthermore, obvious that the various moving parts are to be properly speeded to obtain the best results.

Having thus described the invention, what is claimed as new, is:—

A device of the character described comprising a casing, a hopper communicating with the rear of the upper portion thereof and having a semi-cylindrical bottom having its forward edge terminating at a point in line with its geometrical longitudinal axis, a beater roller in the lower part of said hopper, said casing having a portion of its top wall inclined downwardly from said hopper at a point substantially in line with the top of said roller, a forwardly and downwardly inclined plate extending from the forward edge of said semi-cylindrical bottom parallel with and forming with the inclined wall of said casing a comparatively small feed duct, a downwardly and rearwardly inclined plate in said casing and having its forward edge disposed below the forward edge of said first named inclined plate, curved ribs secured to the forward end of said inclined top portion of the casing and with the forward end of said second named inclined plate, and a spring pressed plate pivoted at the forward edge of said first named inclined plate and extending forwardly and downwardly to a point above and adjacent the forward edge of said last named inclined plate and converging toward the lower ends of said ribs, whereby cotton fed into said hopper will be fed through said duct and form into a compact mass in the constricted space between said pivoted plate and said ribs, and a plurality of saws entering between said ribs and rotating downwardly toward the bottom of said pivoted plate.

In testimony whereof I affix my signature in presence of two witnesses.

ABNER A. GWALTNEY.

Witnesses:
H. A. SPENCE,
S. W. BASSETT.

Copies of this patent may be obtained for five cents each, by addressing the "Commissioner of Patents, Washington, D. C."